United States Patent [19]

Fisher

[11] Patent Number: 5,490,587
[45] Date of Patent: Feb. 13, 1996

[54] GRAVITY ACCUMULATION CONVEYOR APPARATUS

[75] Inventor: Andrew Fisher, Planlo, Tex.

[73] Assignee: Recot, Inc., Wilmington, Del.

[21] Appl. No.: 387,371

[22] Filed: Feb. 13, 1995

Related U.S. Application Data

[63] Continuation of Ser. No. 135,681, Oct. 12, 1993, abandoned.

[51] Int. Cl.⁶ ................................................. B65G 13/00
[52] U.S. Cl. ................................................. 193/35 A
[58] Field of Search .................................. 198/781, 790, 198/781.03; 193/35 A

[56] References Cited

U.S. PATENT DOCUMENTS

| | | |
|---|---|---|
| 1,831,015 | 11/1931 | Le Mare . |
| 2,590,994 | 4/1952 | McKay ................................ 193/35 A |
| 3,557,925 | 1/1971 | Zulauf . |
| 3,627,092 | 12/1971 | Fleischauer et al. . |
| 3,700,078 | 10/1972 | Froio . |
| 3,810,538 | 5/1974 | Moyes . |
| 4,205,740 | 6/1980 | Hammond . |
| 4,219,115 | 8/1980 | Moore ................................ 193/35 A |
| 4,383,598 | 5/1983 | Newman . |
| 4,542,815 | 9/1985 | Leemkuil . |
| 4,798,282 | 1/1988 | Sperduti et al. . |
| 5,048,660 | 4/1991 | Kilper . |

FOREIGN PATENT DOCUMENTS 1173840 10/1960 Germany .
2556991A 12/1975 Germany .

*Primary Examiner*—Joseph E. Valenza

[57] ABSTRACT

A gravity accumulation conveyor apparatus for transporting objects from an upstream end to a downstream end under the influence of gravity as the objects traverse a plurality of rollers, the apparatus having at least one roller zone including a plurality of nondriven rollers having an upstream roller and a spaced downstream roller. A flexible connector such as an O-ring is in mechanical engagement with only the upstream roller and the spaced downstream roller such that only the upstream roller and the downstream roller move in synchronism. When a first object is stopped on the downstream roller, a second object engaging the upstream roller also tends to be stopped. When the first object moves on the downstream roller, the second object engaging the upstream roller is caused to move.

10 Claims, 1 Drawing Sheet

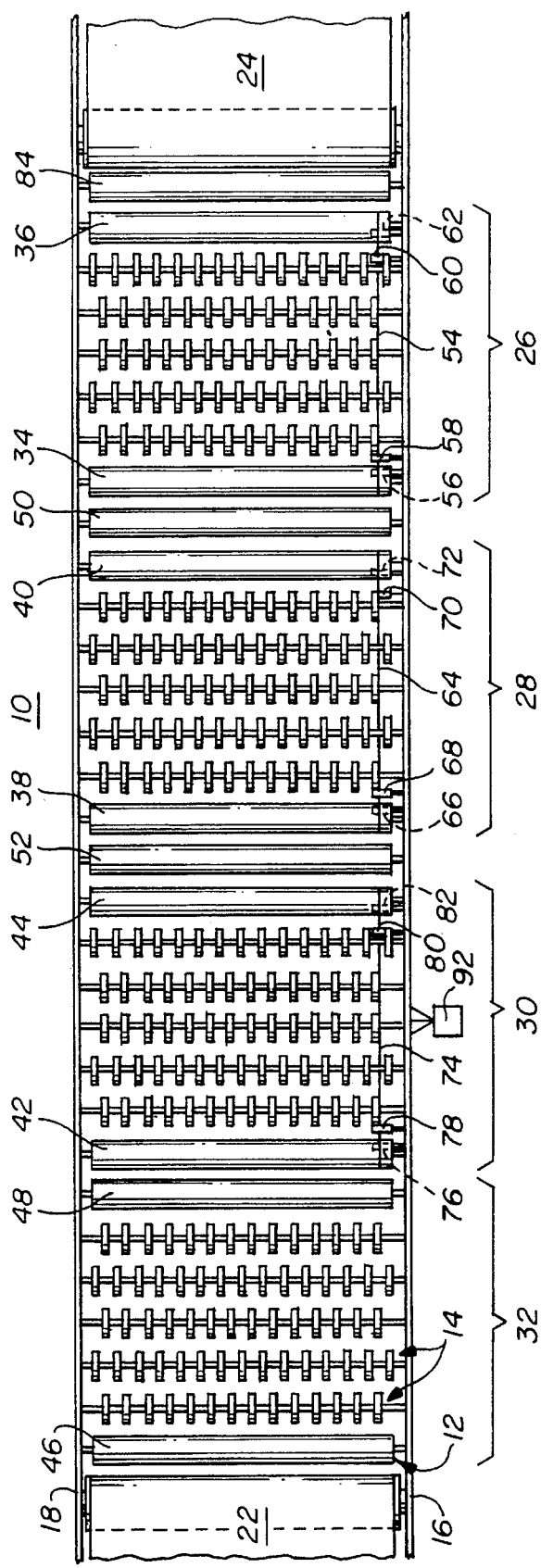
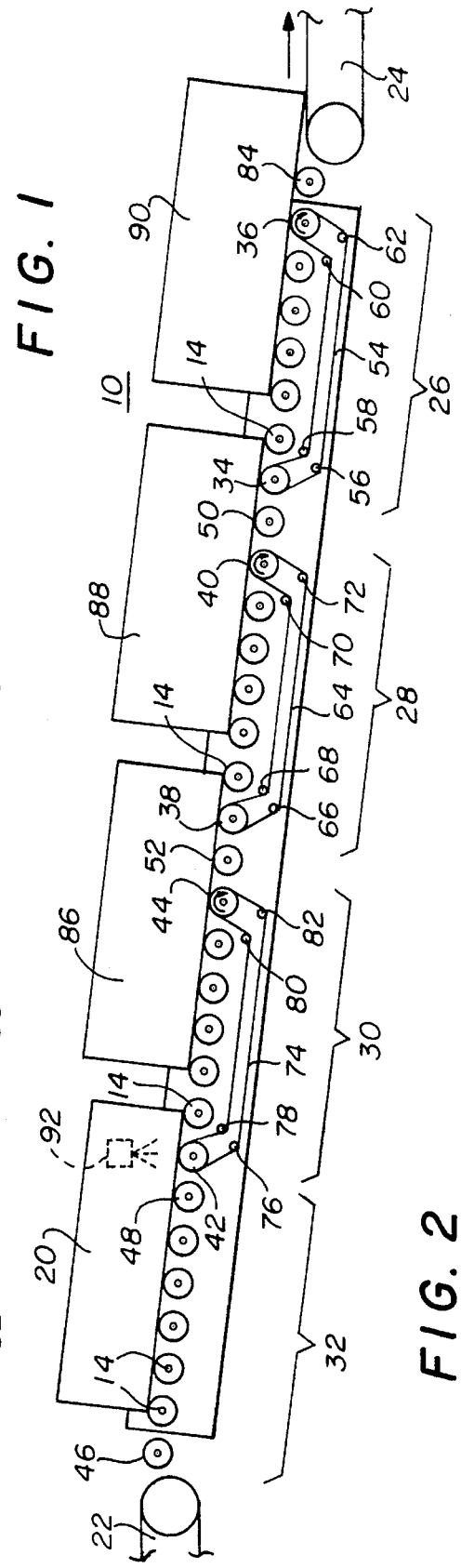
FIG. 1
FIG. 2

GRAVITY ACCUMULATION CONVEYOR APPARATUS

This is a continuation of application Ser. No. 08/135,681 filed on Oct. 12, 1993, now abandoned.

BACKGROUND OF THE INVENTION

1. Field of the Invention

A gravity accumulation conveyor apparatus that generally allows for case accumulation by mechanical means. Specifically, the accumulation system uses "gravity" to propel the cases down the conveyor and an arrangement of connecting devices that connects an upstream roller only to a spaced downstream roller in a defined roller zone provides a :retarding action for cases travelling down the inclined conveyor apparatus when a preceding case has been stopped. Thus the cases are substantially prevented from striking one another with such force as to injure the product therein.

2. Description of Related Art

In using accumulation type gravity conveyor systems, downstream operations can be slowed down allowing cases to be handled more gently by the conveyor system thereby minimizing product breakage within the cases or packages. A downstream operator can control the instantaneous rate of case handling, allowing them to perform critical case handling procedures at a slower rate (such as loading the top of a drop frame trailer) and easier operations (stacking cases on the trailer floor) at a somewhat faster and more natural rate.

Retarding the speed of a moving object, such as a case having product therein or a pallet on a gravitationally actuated conveyor ramp, is an important mechanical operation that must be done effectively as well as expeditiously. In handling such cases or pallets, it is very important that the forward motion of the case, pallet, or other article along the conveyor system be slowed down when one case or article reaches a predetermined location.

Various mechanical devices have been provided to accomplish such a result. Such prior art devices are bulky, complex, expensive to make, difficult to service and maintain, and fail to prevent collisions between cases to the extent necessary to protect the cases and the product therein.

SUMMARY OF THE INVENTION

The present invention overcomes the disadvantages of the prior art by providing a gravity accumulation conveyor apparatus for transporting objects from an upstream end to a downstream end under the influence of gravity as the objects traverse a plurality of rollers. The apparatus has at least one roller zone forming the conveyor apparatus, the at least one roller zone including a plurality of rollers and having an upstream roller and a spaced downstream roller. Connection means such as a rubber "O-ring" is in mechanical engagement with only the upstream roller and the spaced downstream roller in the at least one roller zone such that only the upstream roller and the downstream roller move in synchronism. Thus when a first object is stopped on the downstream roller, the downstream roller stops and the upstream roller stops. Therefore, a second object engaging the upstream roller also tends to be stopped. When the first object again moves on the downstream roller, the second object engaging the upstream roller is caused to move. A plurality of nondriven rollers are disposed between the upstream and downstream rollers and are not engaged by the connection means.

In the preferred embodiment, a plurality of roller zones exist, each zone being separated from the adjacent zone by at least one nondriven roller. The upstream roller of one zone and the downstream roller of an adjacent zone are sufficiently close to enable a first object to be in contact with both of them simultaneously such that if a downstream roller of the one zone is stopped, the first object is stopped and tends to stop both the downstream roller and the upstream roller in the adjacent zone thereby tending to stop a second object thereon and the second object thereon tends to stop the downstream roller in the next adjacent zone thereby tending to stop a third object on the upstream roller in the next succeeding adjacent zone, and so on.

Thus, it is an objective of the present invention to provide an accumulation conveyor that allows for case accumulation by purely mechanical means in an simple and efficient manner.

It is another objective of the present invention to provide a gravity accumulation conveyor apparatus that provides a braking system with the use of an upstream roller and a spaced downstream roller mechanically coupled to each other by a flexible belt.

BRIEF DESCRIPTION OF THE DRAWINGS

These and other objects of the present invention will be more fully understood from the following DESCRIPTION OF THE PREFERRED EMBODIMENT in which like numerals represent like elements and in which:

FIG. 1 is a plan view of a conveyor apparatus of the present invention; and

FIG. 2 is a cross-sectional view of the novel conveyor apparatus.

DESCRIPTION OF THE PREFERRED EMBODIMENT

FIG. 1 is a plan view of the novel gravity accumulation conveyor apparatus generally designed by the numeral 10. The assembly has a plurality of spaced roller assemblies such as those designated by the numerals 12 and 14. Each roller assembly 12 and 14 is mounted in any well-known manner such as by means of bearings (not shown) in side walls 16 and 18. The gravity accumulation conveyor apparatus 10 is inclined at a downward angle as indicated in FIG. 2 to carry packages 20 from a first conveyor belt 22 to a second conveyor belt 24. Because the roller assemblies 12 and 14 are nondriven and freely rotatable, the packages 20 travel by gravity from driven belt 22 to driven belt 24. If the second or bottom belt should stop with a case 90 thereon, the remaining cases, travelling by gravity, would collide with case or package 90, perhaps harming the contents thereof.

In order to keep the packages 20 from colliding with each other as they travel down the incline, it is desirable to have a braking system of some type. The present invention as shown in FIG. 1 and FIG. 2 discloses a very simple but effective braking system. As can be seen in both FIG. 1 and FIG. 2, the plurality of roller assemblies 12 and 14 are formed in roller zones 26, 28, 30, and 32. Each zone 26, 28, 30, and 32 has an upstream roller and a spaced downstream roller. In zone 26, the upstream roller is roller 34 and the downstream roller is roller 36. In zone 28, the upstream roller is roller 38 and the downstream roller is roller 40. In roller group 30, the upstream roller is roller 42 and the downstream roller is roller 44. In group 32, the upstream roller is roller 46 and the downstream roller is roller 48. It will be noted that in group 26 a connection means 54 such as a rubber O-ring that rides in grooves (not shown) in the upstream roller 34 and the downstream roller 36 is in mechanical engagement with only the upstream roller 34 and the downstream roller 36. As can be seen in the side view in FIG. 2, the O-ring 54, after it passes over upstream roller 34 in roller group 26, rides under guide rollers 56 and 58 to guide rollers 60 and 62 where it then passes over the downstream roller 36. In this manner, only the upstream roller and the downstream roller are coupled by the O-ring 54 and are the only rollers in roller group 26 that move in synchronism. The other rollers 14 are free to roll in the normal fashion. The same arrangement is illustrated in roller group 28 wherein it can be seen that the connection means 64, such as a rubber o-ring, couples only the upstream roller 38 and the downstream roller 40 again using guide rollers 66 and 68 and 70 and 72 to prevent the O-ring or connection means 64 from contacting any of the other rollers 14. Again, only the upstream roller 38 and the downstream roller 40 are mechanically coupled together with the O-ring 64 and move in synchronism with each other.

In like manner, in roller group 30, the connection means 74 mechanically couples only the upstream roller 42 and the downstream roller 44. Again the rollers 14 in between the upstream roller 42 and the downstream roller 44 are free to roll individually. The guide rollers 76 and 78 and 80 and 82 again keep the connection means 74 from contacting the other rollers 14. In group 32, all of the rollers including the upstream roller 46 and the downstream roller 48 are free moving rollers although the upstream roller 46 and the downstream roller 48 could, if desired, be mechanically coupled by a connection means such as those previously described. It will be noted that any two adjacent zones have an upstream roller and a downstream roller that are sufficiently close that a case or package passing over the rollers will contact the downstream roller in one zone and the upstream roller in the adjacent zone simultaneously. For example, as illustrated in FIG. 2, case 86 is on the downstream roller 44 of roller group 30 and is simultaneously on the upstream roller 38 of roller group 28. In like manner, case 88 is on the downstream roller 40 of roller group 28 and in contact with the upstream roller 34 of group 26.

Of course, rollers 14 can be grooved appropriately for enabling the connection means 54, 64, and 74 to glide therethrough so that rollers 34 and 36, the upstream and downstream rollers of group 26, can be connected directly only to each other without the need for guides 56, 58, 60, and 62. The decision to use this option is driven by the economics for a given zone size desired.

Consider now the operation of the novel device. Assume that cases or packages 20, 86, 88, and 90 shown in FIG. 2 have been transported from belt 22 onto the gravity accumulation conveyor apparatus 10 on the way to conveyor belt 24. Assume also that conveyor belt 24 has stopped. When the first case or box 90 contacts the conveyor belt 24 as shown, it will stop because conveyor belt 24 is stopped. Because box 90 is resting on downstream roller 36 of roller group 26, roller 36 is also stopped. Because it is mechanically coupled to roller 34, the upstream roller in group 26, upstream roller 34 is also stopped. When box or case 88 comes down the gravity accumulation conveyor apparatus 10 and strikes upstream roller 34 which is also stopped because of the connection means such as O-ring 54, a rubber frictional surface on the upstream roller 34 tends to stop the motion of case 88. The frictional surface is well known and may be of any type in the art. Because case 88 is simultaneously on the upstream roller 34 of roller group 26 and on downstream roller 40 of adjacent roller group 28, connection means 64 will also stop the upstream roller 38 in group 28 from rotating. Thus when the case 86 contacts the frictional surface of upstream roller 38 in group 28, it will tend to stop case 86. When case 86 stops, it stops downstream roller 44 of roller group 30. 5Because downstream roller 44 is mechanically coupled to upstream roller 42 of group 30, then upstream roller 42 also stops. Thus when the next case 20 comes down the conveyor apparatus 10 and strikes the upstream roller 42 of roller group 30, it will tend to stop case 20.

In reverse description, when roller belt 24 begins to move again, it will carry case or package 90 forward and began to rotate downstream roller 36 of group 26. This will also tend to rotate upstream roller 34 of roller group 26 by connection means 54 which will cause motion of the case 88 to begin. When case 88 begins to move, it will rotate the downstream roller 40 of adjacent roller group 28 by connection means 64 thus causing upstream roller 38 to tend to begin to move. This will, in turn, cause case or package 86 to tend to begin to move. As case or package 86 moves, it will rotate downstream roller 44 which, in turn, tends to rotate upstream roller 42 and thus causes case or package 20 to begin to move. Because the O-rings 54, 64, and 74 are flexible, they have some relative movement before they will begin to move the upstream and downstream rollers that they contact. This will enable the cases 20, 86, 88, and 90 to come to a gradual stop rather than an immediate stop and will allow the cases 20, 86, 88, and 90 to begin to move gradually when the first or lead case moves rather than having an immediate movement. This enables the cases to maintain a separation distance or, if they contact each other, it will be a gentle contact thus protecting the contents of the cases. Where the cases are filled with product such as potato chips, which are easily broken, the system has a tendency to prevent the product from being broken.

This system may of course include photocells 92 as needed to control the movement of the power driven belts 22 and 24. For instance, if case 20 interferes with the passage of light from photocell 92 for a predetermined period of time, the interruption of the light indicates that case 20 has stopped and thus the photocell can stop movement of belt 22 thus preventing more cases from coming in contact with case 20. Free-wheeling idler rollers 50 and 52 separate roller group 26 from roller group 28 and roller group 28 from roller group 30.

The system is flexible so that zones can also be set up in overlapping relationship with the same density of control rollers (i.e. 34–36, 38–40) but connected in such a way that roller 36 is connected to roller 40 and roller 34 is connected to roller 38 to have the same braking ability with larger, overlapping zones.

It should be apparent that if heavier cases are required to be carried by the conveyor system 10, that either the size of the O-ring or flexible connection means 54, 64, and 74 connecting the upstream and downstream rollers in each group could be made larger or an additional O-ring or connection means could be placed in grooves on the other ends of the same upstream and downstream rollers to provide greater braking action.

Thus, there has been disclosed a novel gravity accumulation conveyor apparatus for transporting objects from an upstream end to a downstream end under the influence of gravity as the objects traverse a plurality of rollers mounted in a frame. The conveyor comprises at least one roller zone in which a plurality of rollers separate an upstream roller and a downstream roller in spaced relationship in a given roller zone. A connection means, such as an O-ring, is in mechanical engagement with only the upstream roller and the spaced downstream roller in a given roller zone such that only the upstream roller and the downstream roller in that zone move in synchronism. When a first object is stopped on the downstream roller, a second object engaging the upstream roller also tends to be stopped and, when the first object moves on the downstream roller, the second object engaging the upstream roller is caused to move. The connection means is a flexible drive means for joining the upstream roller and the downstream roller in operative engagement and may be a flexible O-ring or a flexible belt. The plurality of rollers disposed between the upstream and downstream rollers and which are not engaged by the connection means are non-driven rollers.

In the preferred embodiment, a plurality of roller zones exist, each zone being separated from the adjacent zone by at least one nondriven roller. The upstream roller of one zone and the downstream roller of the adjacent zone are sufficiently close to enable a first object, such as a case or box, to be in contact with both of them simultaneously. Under such conditions, if a downstream roller of one zone is stopped, an object or case thereon stops the upstream roller in the adjacent zone thereby tending to stop a second object thereon. The second object tends to stop the downstream roller in the next adjacent zone thereby tending to stop a third object on the upstream roller in the adjacent zone and so forth. The upstream and downstream rollers are elongated rollers that extend from one side wall of the conveyor system to the other side wall. This provides a large frictional surface when the rollers have a frictional surface such as rubber.

While the invention has been described in connection with a preferred embodiment, it is not intended to limit the scope of the invention to the particular form set forth, but, on the contrary, it is intended to cover such alternatives, modifications, and equivalents as may be included within the spirit and scope of the invention as defined by the appended claims.

I claim:

1. A gravity accumulation conveyor apparatus for transporting objects from an upstream end down an incline to a downstream end under the influence of gravity as the object traverses a plurality of rollers, the apparatus comprising:

at least one roller zone forming the conveyor apparatus, the at least one roller zone including at least three rollers and having an upstream roller and a spaced downstream roller separated by at least one roller; and connection means in continuous mechanical engagement with only the upstream roller and the spaced downstream roller in the at least one roller zone so as to bypass the at least one separating roller such that the connection means moves only the upstream roller and the downstream roller together in substantial synchronism whereby when a first object is stopped on the downstream roller, a second object engaging the upstream roller also tends to be stopped and, when the first object moves on the downstream roller, the second object engaging the upstream roller is caused to move.

2. An apparatus as in claim 1 wherein the connection means is a flexible drive means for joining the upstream roller and the downstream roller in operative engagement.

3. An apparatus as in claim 2 wherein the flexible drive means is a flexible O-ring.

4. An apparatus as in claim 2 wherein the flexible drive means is a flexible belt.

5. An apparatus as in claim 3 further including a plurality of rollers disposed between the upstream roller and downstream roller and which are not engaged by the connection means.

6. An apparatus as in claim 1 further comprising a plurality of adjacent roller zones, each zone being separated from the adjacent zone by at least one nondriven roller.

7. An apparatus as in claim 6 wherein the upstream roller of one zone and the downstream roller of an adjacent zone are sufficiently close to enable a first object to be in contact with both of them simultaneously such that if a downstream roller of the one zone is stopped, the first object tends to stop the upstream roller in the next adjacent zone thereby tending to stop a second object thereon and the second object thereon tends to stop the downstream roller in the next adjacent zone thereby tending to stop a third object on the upstream roller in the adjacent zone such that objects on the upstream roller of all adjacent zones tend to be stopped.

8. An apparatus as in claim 1 or claim 7 further comprising:

a frame having spaced side walls forming the conveyor apparatus; and an elongated upstream roller and an elongated downstream roller extending from one side wall to the other.

9. An apparatus as in claim 8 wherein the upstream roller and the downstream roller have at least a frictional surface thereon such as rubber.

10. An accumulation conveyor apparatus for transporting packages from an upstream end to a downstream end by gravity, the apparatus comprising:

three or more nondriven rollers in spaced relation with each other and having at least one upstream roller and at least one spaced downstream roller separated by at least one roller; and connection means in continuous mechanical engagement with only the upstream roller and the downstream roller and bypassing the at least one separating roller such that the connection means moves only the upstream roller and the downstream roller in substantial synchronism to allow the upstream roller to rotate when the downstream roller is rotating and to stop rotation when the downstream roller is stopped from rotating.

* * * * *